United States Patent [19]

Suk

[11] Patent Number: 5,004,199
[45] Date of Patent: Apr. 2, 1991

[54] BRACKET

[75] Inventor: Eugene J. Suk, Pittsburgh, Pa.

[73] Assignee: American Electric FL Industries, Inc., Division, Memphis, Tenn.

[21] Appl. No.: 522,987

[22] Filed: May 14, 1990

[51] Int. Cl.⁵ .......................... H02G 3/00; F16B 2/00
[52] U.S. Cl. .................... 248/231.8; 248/906; 248/228; 248/300; 220/3.9
[58] Field of Search ............ 248/231.8, 228, 300, 248/311.2, 906, 27.1, 229; 174/63; 220/3.9, 3.3

[56] References Cited

U.S. PATENT DOCUMENTS

| | | | |
|---|---|---|---|
| 3,131,447 | 5/1964 | Tinnerman | 248/231.8 |
| 3,588,019 | 6/1971 | Cozeck | 248/906 X |
| 3,720,395 | 3/1973 | Schuplin | 248/229 |
| 3,780,209 | 12/1973 | Schuplin | 248/906 X |
| 3,977,640 | 8/1976 | Arnold et al. | 248/542 |
| 4,135,337 | 1/1979 | Medlin | 248/228 X |
| 4,140,293 | 2/1979 | Hansen | 248/906 X |
| 4,645,089 | 2/1987 | Horsley | 248/27.1 X |
| 4,747,506 | 5/1988 | Stuchlik, III | 248/906 X |

Primary Examiner—Karen J. Chotkowski
Attorney, Agent, or Firm—Jones, Day, Reavis & Pogue

[57] ABSTRACT

A bracket for mounting electrical boxes to channel-shaped metal wall studs having open and closed sides. The bracket has opposed stud gripping elements that enable the bracket to be mounted to studs of different sizes, and to either the open or closed side of the stud.

28 Claims, 3 Drawing Sheets

BRACKET

BACKGROUND OF THE INVENTION

This application relates to the art of support brackets and, more particularly, to such brackets for mounting electrical boxes on wall studs. The invention is particularly applicable to brackets for mounting electrical boxes to channel-shaped metal wall studs, and will be described with specific reference thereto. However, it will be appreciated that the invention has broader aspects, and the bracket can be used for mounting electrical boxes to other types of studs.

The dimensions of channel-shaped metal wall studs are not standardized. In particular, the width of the flanges and flange lips on such studs vary from one manufacturer to another. Therefore, it is common to provide box mounting brackets in different sizes to accommodate the corresponding different wall stud sizes. In addition, many brackets of the type described are mountable to only one of the open or closed side of the channel-shaped metal wall stud.

It would be desirable to have a box mounting bracket that could be mounted to channel-shaped wall studs of different sizes, while also being selectively mountable to either the open or closed side of the stud.

SUMMARY OF THE INVENTION

A box mounting bracket of the type described is automatically adjustable for gripping wall studs of different dimensions. The bracket is also selectively mountable to either the open or closed side of a channel-shaped metal wall stud.

The box mounting bracket includes a web having a pair of spaced-apart first and second opposed flanges extending therefrom. A metal wall stud is receivable between the bracket flanges, and gripping means on the flanges grips the stud for holding the bracket thereto.

The gripping means on the flanges may be in the form of a plurality of sharp barbs spaced both longitudinally and transversely of the flanges.

In a preferred arrangement, an elongated resilient arm is connected with the first flange at a location remote from the bracket web. The resilient arm extends along the first flange in inwardly inclined relationship thereto. The resilient arm terminates in an arm terminal end portion located closely adjacent the bracket web. The first flange gripping means or barbs are on the arm terminal end portion and face toward the second or opposite flange.

The second bracket flange has opposite side edges and a terminal end. Flange extensions extend outwardly from the opposite side edges of the second flange adjacent the terminal end thereof. Each flange extension has a plurality of spaced-apart barbs thereon.

In a preferred arrangement, at least one barb on each flange extension on the second flange extends inwardly toward the first flange a greater distance than the other barbs. These barbs that extend inwardly the greatest distance are preferably located closest to the terminal end of the second flange.

The extensions on the second flange are preferably bent inwardly along bend lines coincidental with the opposite side edges of the second flange. Thus, the plural barbs on each flange extension are spaced outwardly from the opposite side edges of the second flange, and also extend inwardly of the second flange toward the first flange and its resilient arm.

The second flange preferably includes at least one central barb extending inwardly thereof. With the central barb and the barbs on the flange extensions, the second flange has barbs located both inwardly and outwardly from its opposite side edges.

The bracket web has a web length between opposite web ends. The second flange is on a web extension that extends outwardly from the bracket web and has a length substantially less than the web length. The web extension is preferably located substantially centrally between the opposite web ends. The web extension has a width that is substantially less than the width of the bracket web.

The bracket web preferably has a plurality of spaced-apart holes therein for receiving fasteners that extend into a wall stud for more secure mounting of the bracket thereto.

It is a principal object of the present invention to provide an improved box mounting bracket that is capable of being mounted to channel-shaped wall studs having different dimensions.

It is also an object of the invention to provide such a box mounting bracket that is selectively mountable to either the open or closed side of a channel-shaped metal wall stud.

It is a further object of the invention to provide such a bracket having plural resilient gripping means for gripping a wall stud.

It is an additional object of the invention to provide such a bracket having an improved location for a resilient arm that resiliently grips a wall stud while providing optimum automatic adjustment for different stud sizes.

It is another object of the invention to provide such a bracket having a bracket flange with stud gripping barbs in optimum locations and spacings.

DESCRIPTION OF A PREFERRED EMBODIMENT

Figure 1:
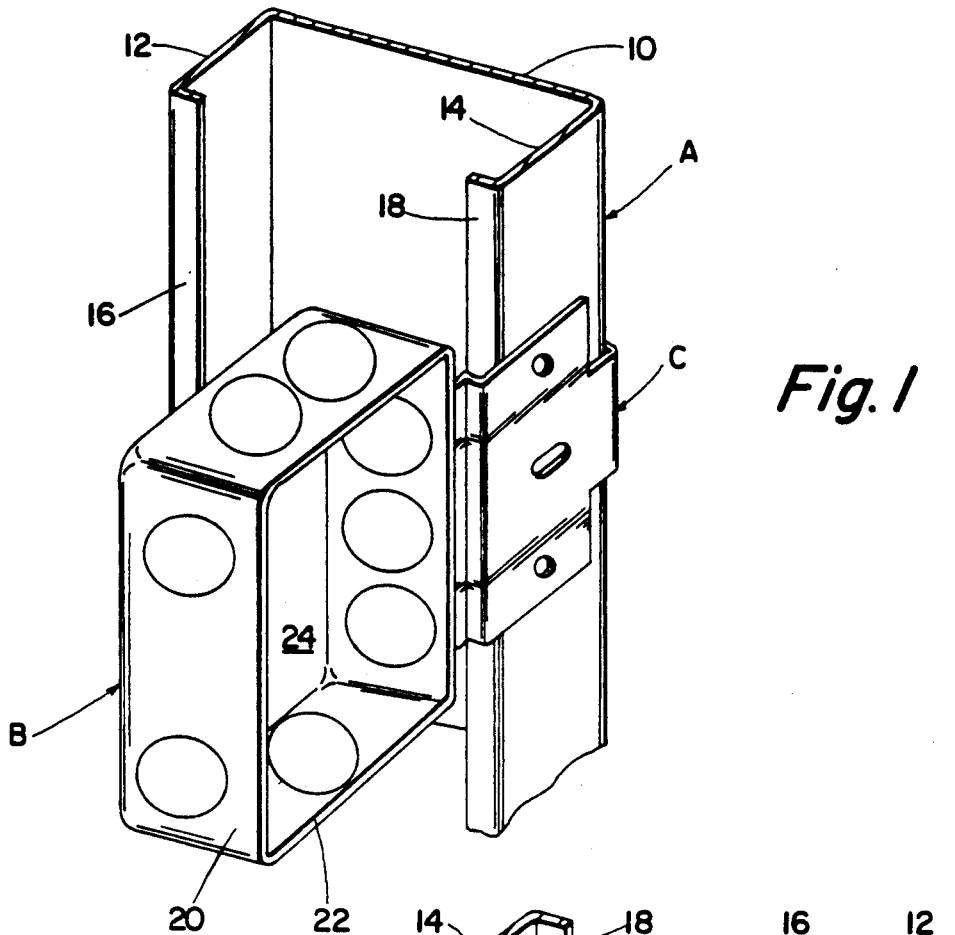
FIG. 1 is a perspective illustration showing an electrical box mounted to an open side of a channel-shaped metal wall stud.

Referring now to the drawing, wherein the showings are for purposes of illustrating a preferred embodiment of the invention only and not for purposes of limiting same, FIG. 1 shows a channel-shaped metal wall stud A having an electrical box B mounted thereto using a box mounting bracket C constructed in accordance with the present application.

Channel A includes a channel web 10 having a pair of parallel spaced-apart channel flanges 12, 14 extending perpendicular thereto. Inturned lips 16, 18 on the terminal end portions of channel flanges 12, 14 extend generally parallel to channel web 10. The width of channel flanges 12, 14 frequently varies from one manufacturer to another. In addition, the width of lips 16, 18 may also vary.

Figure 2:
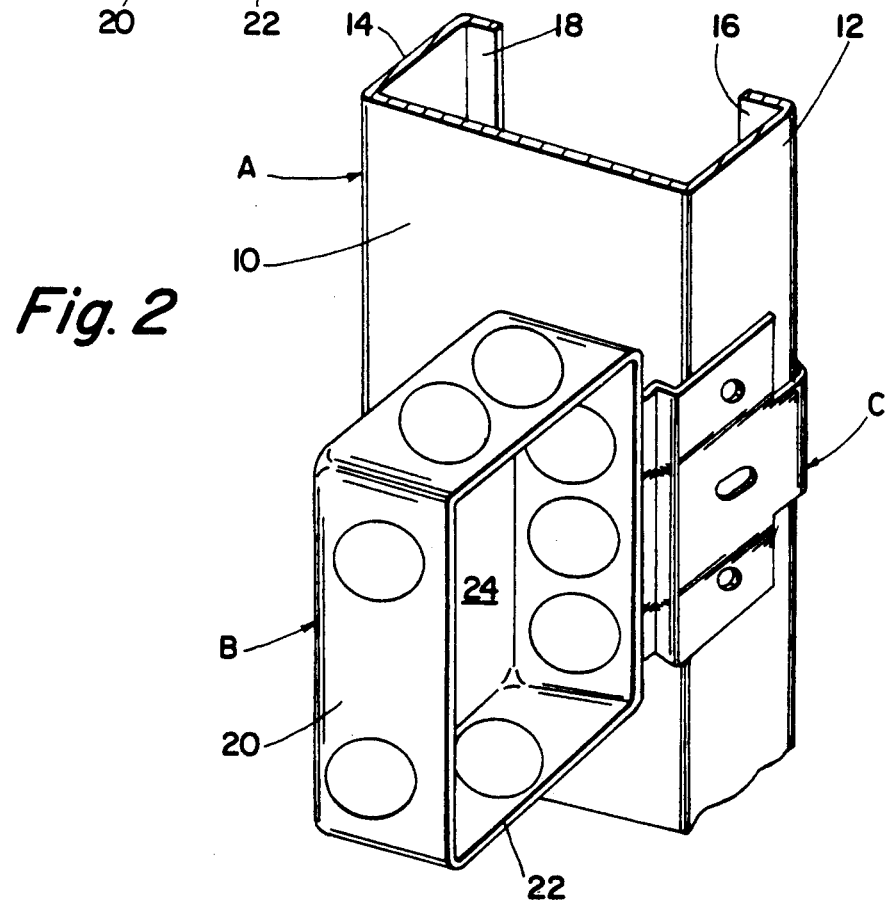
FIG. 2 is a perspective illustration showing an electrical box mounted to a closed side of a channel-shaped metal wall stud.

Electrical box B is of a conventional type, and includes a generally rectangular peripheral side wall 20 having an open front end 22, and a rear end that is closed by a rear wall 24. Bracket C is attached to a side wall of box B, and span channel flange 14 to grip channel web 10 and lip 18. FIGS. 1 and 2 simply show that the bracket of the present application can be used for mounting box B on either the open or closed side of channel A.

Referring to FIGS. 3-7, box mounting bracket C includes a bracket web 30 having a pair of spaced-apart first and second opposed flanges 32, 34 extending outwardly therefrom. Bracket flanges 32, 34 are substantially parallel to one another and substantially perpendicular to bracket web 30. First flange 32 extends a substantially greater distance from bracket web 30 then second flange 34.

In the arrangement shown, first flange 32 is also a box attaching flange, and has attaching means thereon for attaching same to a side wall of an electrical box. The box attaching means may take many forms, and in one arrangement a plurality of spaced-apart dimples 36 are deformed outwardly of first flange 32 for welding same to a metal box side wall. It will be recognized that the box attaching means could also be fastener receiving holes in first flange 32. The box attaching means could also be an integral or attached extension on first flange 32 for gripping or clamping engagement with an electrical box side wall.

The intersection between bracket web 30 and first flange 32 is stepped or recessed as generally indicated at 38 for spacing the open front of an electrical box to the rear of a wall stud flange, and also provides space to receive a box cover.

First bracket flange 32 has a free end portion generally indicated at 40 located remote from bracket web 30. An elongated resilient arm 42 is connected with flange free end portion 40 and extends generally along first flange 32 toward bracket web 30. Resilient arm 42 extends along first flange 32 in inwardly inclined relationship thereto at an included angle 44 between about 15-25 degrees.

In a preferred arrangement, resilient arm 42 is integral with first flange 32, and is formed by smoothly reversely bending an extension of first flange 32 as generally indicated at 46. Resilient arm 42 is centrally located between opposite ends 48, 50 of first flange 32, and has a transverse arm width that is greater than one-half the distance between first flange opposite ends 48, 50.

Resilient arm 42 is located in the space between first and second bracket flanges 32, 34, and extends inwardly from first flange 32 less than one-half the distance toward second flange 34. Resilient arm 42 has an arm terminal end portion 52 located closely adjacent bracket web 30. Gripping means on arm terminal end portion 52 extends outwardly therefrom towards second flange 34 for gripping a wall stud. The gripping means may comprise a plurality of spaced-apart primary and secondary barbs or teeth 56, 58 deformed outwardly from resilient arm 42. In the relaxed and unstressed condition of resilient arm 42, barbs or teeth 56, 58 extend generally parallel to bracket web 30 toward second flange 34. Primary and secondary barbs 56, 58 on arm end portion 52 provide arm 42 and first flange 32 with a plurality of barbs that are spaced-apart from one another in directions extending both longitudinally and transversely of arm 42.

Bracket web 30 has a web length between opposite web ends 60, 62 that is substantially greater than the length of second bracket flange 34 between opposite side edges 64, 66 thereof. Second bracket flange 34 is preferably centrally located between opposite bracket web ends 60, 62.

Bracket web 30 has a web extension 30a lying in a common plane therewith and centrally located between opposite web ends 60, 62. Web extension 30a has a length substantially the same as the length of second flange 34 between its opposite side edges 64, 66. Web extension 30a extends outwardly from the main portion of web 30 a distance substantially less than the width of web 30 measured in a direction between opposite flanges 32, 34. That is, the width of web extension 30a measured in a direction between flanges 32, 34 is substantially less than the width of web 30 measured in the same direction. Web 30 has a plurality of spaced-apart holes 70 therethrough for receiving fasteners that extend into a wall stud flange 12 or 14 for securing bracket web 30 thereto.

Second flange 34 has a terminal end 72, and flange extensions 74, 76 extend outwardly from flange side edges 64, 66 adjacent flange terminal end 72. Flange extensions 74, 76 are spaced a substantial distance from bracket web 30. Flange extensions 74, 76 are bent inwardly of second flange 34 along bend lines generally indicated at 78, 80 that are coincidental with flange opposite side edges 64, 66.

Figure 6:
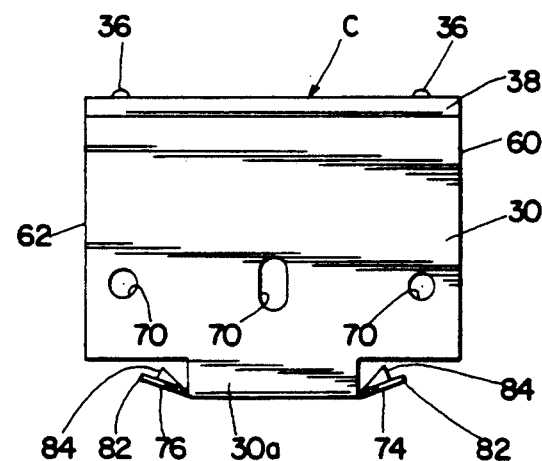
FIG. 6 is a top plan view thereof.

Each flange extension 74, 76 has stud gripping means thereon. In the arrangement shown, the stud gripping means on each flange extension includes an initial barb 82 spaced a substantial distance from, but located closest, to bracket web 30, and a terminal barb 84 located closest to, flange terminal end 72. Initial barbs 82 lie in substantially the same plane as flange extensions 74, 76. Terminal barbs 84 are deformed inwardly of extensions 74, 76 toward opposite first flange 32. Barbs 82, 84 extend inwardly of second flange 34 different distances. As best shown in FIG. 6, terminal barbs 84 extend inwardly toward the opposite flange a greater distance than initial barbs 82. Barbs 82, 84 provide second flange 34 with a plurality of barbs that are spaced-apart from one another in directions both longitudinally and transversely of second flange 34.

Figure 3:
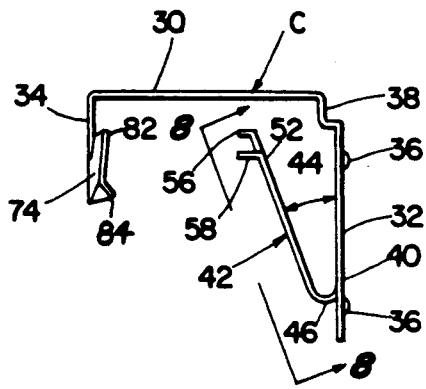
FIG. 3 is an end elevational view of a box mounting bracket constructed in accordance with the present application.
Figure 4:
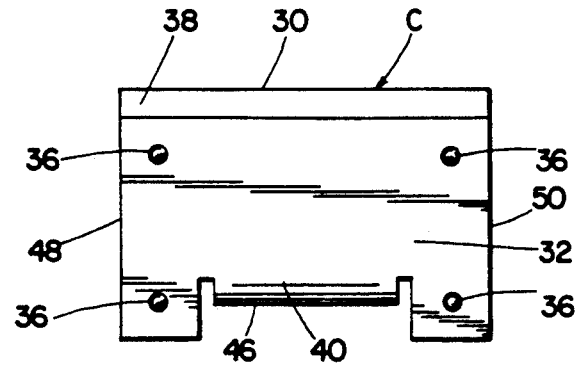
FIG. 4 is a side elevational view thereof.

Second flange 34 has central stud gripping means in the form of a central resilient finger 90 deformed inwardly thereof and terminating in transversely spaced-apart barbs 92. The sharp ends of barbs 92 are spaced inwardly of second flange 34 approximately the same distance as the sharp ends of terminal barbs 84. Also, barbs 92 are approximately transversely aligned with initial barbs 82. Barbs 82, 84, and 92 provide second flange 34 with a plurality of barbs located both outwardly and inwardly of flange side edges 64, 66. As best shown in FIG. 3, primary barbs 56 on resilient arm 42 are approximately opposite from initial barbs 82 on second flange 34. Secondary barbs 58 on resilient arm 42 are generally between the sharp ends of barbs 82, 84.

Figure 5:
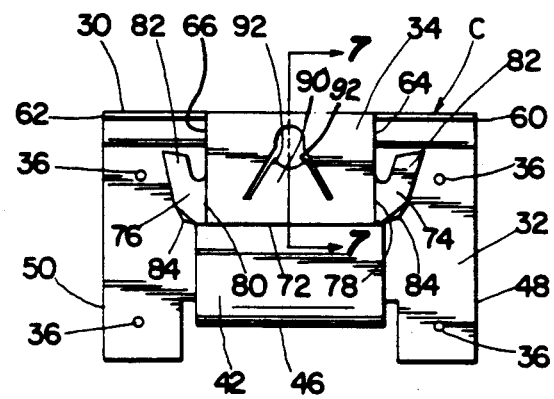
FIG. 5 is a side elevational view of the opposite side thereof.
Figure 7:
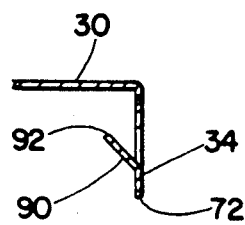
FIG. 7 is a partial cross-sectional elevational view taken generally on line 7—7 of FIG. 5.
Figure 8:
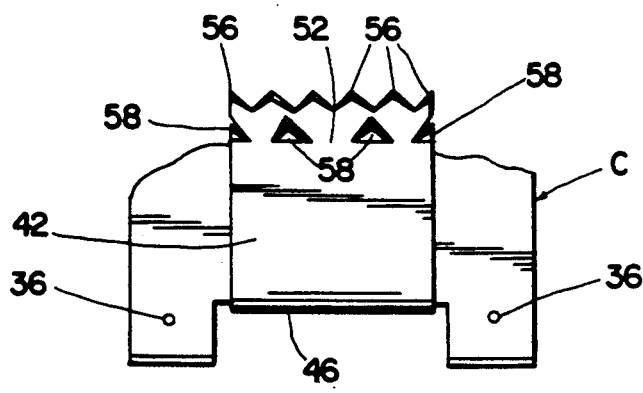
FIG. 8 is a partial elevational view taken generally on line 8—8 of FIG. 3.
Figure 9:
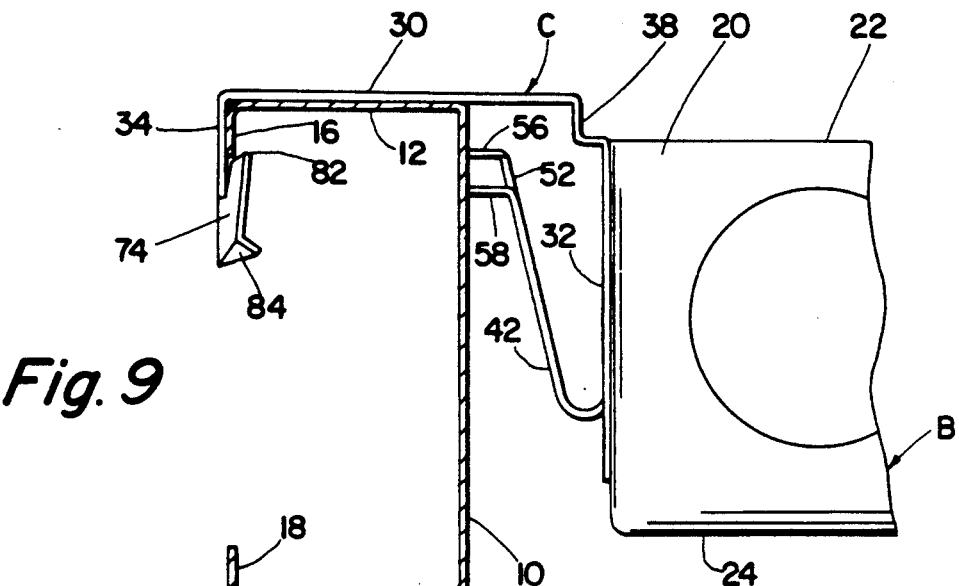
FIG. 9 is a cross-sectional elevational view showing the bracket attached to a channel-shaped metal wall stud, with an electrical box on the closed side of such stud.
Figure 10:
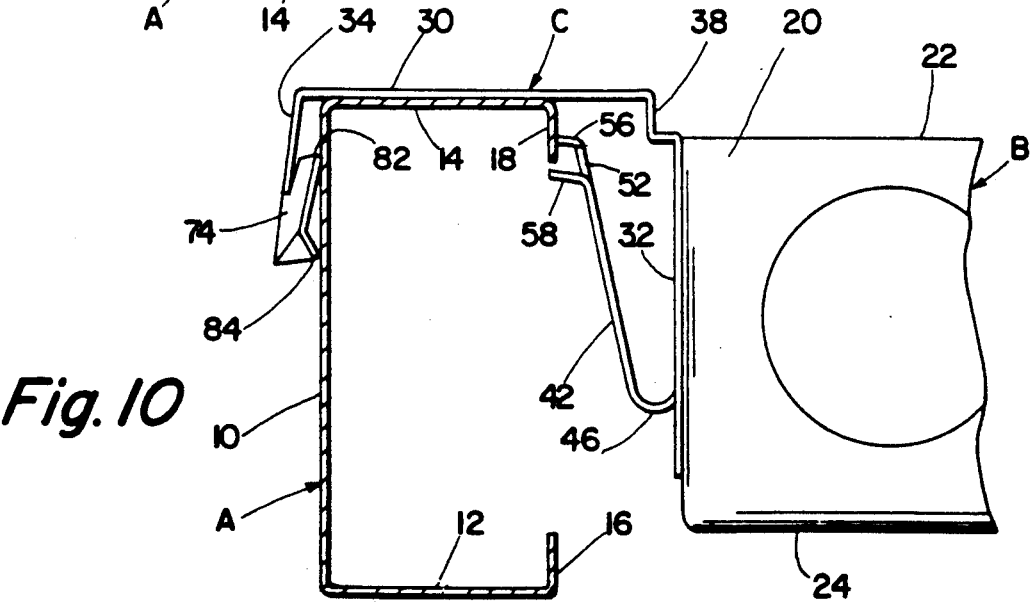
FIG. 10 is a cross-sectional plan view showing the bracket mounted to a channel-shaped metal wall stud, with an electrical box located on the open side of the stud.

FIGS. 9 and 10 show electrical box B mounted on closed and open sides of channel-shaped wall stud A by using bracket C. In FIG. 9, primary and secondary barbs 56, 58 on arm end portion 52 are shown gripping and biting into channel web 10. Barbs 82 on second flange 34 are shown as being hooked around beneath flange lip 16. Bracket C is preferably made of spring metal and, in its installed position, resilient arm 42 is under bending stress and bent closer toward first flange 32. The resilient stress in arm 42 firmly pulls second flange 34 toward lip 16. For wall studs having a flange 12 of different width, only one of primary or secondary barbs 56, 58 on arm 42 may engage stub web 10. This depends upon the amount of bending imparted to arm 42 toward first flange 32 for receiving the wall stud between the bracket flanges. In the arrangement of FIG. 9, the central barbs 92 of FIG. 5 and 7 are not shown but would also engage around and beneath lip 16.

Barbs 82 on flange extensions 74, 76 have outer ends that are inclined downwardly toward flange terminal end 72 from the outer sharp ends thereof. That is, the outer ends of barbs 82 slope downwardly toward flange side edges 64, 66 in a direction toward flange terminal end 72 from the outermost sharp ends of such barbs. This allows the sharp outer ends of barbs 82 to be received behind a stud lip 16 even though the lip 16 may have somewhat different widths.

In the arrangement of FIG. 10, primary barbs 56 on resilient arm 42 are shown gripping and biting into stud lip 18. Depending upon the width of stud flange 14 and upon the length of a flange lip 18, both of primary and secondary barbs 56, 58, or only one or the other, may grippingly engage lip 18. Barbs 82, 84 on flange 34 are shown gripping and biting into stud web 10. Although not shown in FIG. 10, it will be recognized that central barbs 92 of FIGS. 5 and 7 will also bite into stud web 10.

Elongated arm 42 has a length substantially greater than the length of second flange 34 and provides automatic adjustment over a wide range for resiliently gripping across a stud flange of many different widths. Location of all the barbs on both bracket flanges spaced both longitudinally and transversely of the flanges makes it possible to accommodate many different stud sizes, and to mount the bracket to either the open or closed side of a wall stud. Locating the barbs 82, 84 on second flange 34 at different distances inwardly from second flange 34 allows first barbs 82 to provide the primary gripping action beneath a lip 16 when second flange 34 is on the lip side of a wall stud. When second flange 34 is on the web side of a wall stud, barbs 84 may perform a primary gripping and biting action on stud web 10. The resilient and biting action provided by the bracket of the present application securely holds the same in place on a channel-shaped metal wall stud. If desired, additional fasteners may be extended through the stud flange and bracket web for securely holding the bracket to the stud.

The bracket may be installed by inclining same relative to a wall stud and hooking or rocking same around the stud flange. By way of example, in the arrangement of FIG. 9, barbs 82 on second flange 34 may first be hooked beneath channel flange lip 16. Box B and bracket C may then be pivoted clockwise in FIG. 9 to force resilient arm 42 and barbs 56, 58 thereon around the opposite corner of the stud into the position shown in FIG. 9. In the alternative, it may sometimes be possible to incline the bracket relative to the stud and to first engage barbs 56, 58 on resilient arm 42 with stud web 10. A pushing and rocking force is then maintained on the box and bracket to deform arm 42 toward box B while pivoting the bracket counter-clockwise until barbs 82 on flange 34 hook beneath flange lip 16. The installation procedure can be the same in the arrangement of FIG. 10.

As best shown in FIG. 5, barbs 82 are separated from, and spaced outwardly of, flange side edges 64, 66. Barbs 82 are also longitudinally elongated to extend substantially outwardly from extensions 74 back toward bracket web 30. This gives barbs 82 individual bendability in directions generally perpendicular to second flange 34.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A bracket for mounting electrical boxes to wall studs, said bracket including a web having a pair of first and second opposed flanges extending therefrom and between which a wall stud is receivable, said first flange being substantially longer than said second flange and having a free end portion remote from said web, an elongated resilient arm extending from said free end portion of said first flange back toward said web in inwardly inclined spaced relationship to said first flange, said arm being substantially longer than said second flange and having an arm terminal end portion adjacent said web, and stud gripping means on said arm terminal end portion and on said second flange for gripping a stud therebetween.

2. The bracket of claim 1 wherein said stud gripping means on said arm terminal end portion comprises a plurality of spaced-apart barbs.

3. The bracket of claim 2 wherein said barbs are spaced-apart transversely of said arm.

4. The bracket of claim 2 wherein said barbs are spaced-apart longitudinally of said arm.

5. The bracket of claim 1 wherein said resilient arm is integral with said first flange.

6. The bracket of claim 1 wherein said resilient arm is inwardly inclined with respect to said first flange at an included angle of about 15-25 degrees.

7. The bracket of claim 1 wherein said first flange comprises a box attaching flange and has box attaching means thereon.

8. The bracket of claim 1 wherein said web has a web length between oppposite web ends and said arm has an arm width substantially less than said web length.

9. The bracket of claim 1 wherein said stud gripping means on said second flange comprises a plurality of spaced-apart barbs.

10. The bracket of claim 9 wherein said barbs are spaced-apart transversely of said second flange.

11. The bracket of claim 9 wherein said barbs are spaced-apart longitudinally of said second flange.

12. The bracket of claim 1 wherein said second flange has opposite side edges and a terminal end, extensions extending outwardly from said side edges adjacent said terminal end, and said gripping means on said second flange being on said extensions.

13. The bracket of claim 12 wherein said gripping means comprises a plurality of barbs on each of said extensions spaced-apart longitudinally of said second flange.

14. The bracket of claim 13 wherein said extensions are bent inwardly of said second flange.

15. The bracket of claim 14 wherein at least one of said barbs on each of said extensions is deformed inwardly of its extension.

16. The bracket of claim 1 wherein said second flange has opposite side edges and said stud gripping means on said second flange includes a plurality of transversely spaced-apart barbs located both outwardly and inwardly of said side edges.

17. A bracket for mounting electrical boxes to wall studs, said bracket including a web having a pair of spaced-apart opposed first and second flanges extending therefrom for receiving a wall stud therebetween, said flanges having stud gripping means thereon for gripping a stud therebetween, said second flange having opposite side edges and a terminal end, extensions connected with said side edges of said second flange adjacent said terminal end thereof, said extensions projecting outwardly from said side edges and back toward said web in outwardly-spaced relationship to said side edges, said extensions being bent inwardly of said second flange toward said first flange about bend lines extending along said side edges, and said stud gripping means on said second flange including a plurality of barbs on each said extension spaced-apart longitudinally of said second flange.

18. The bracket of claim 17 including extensions extending outwardly from said side edges adjacent said terminal end, said barbs being on said extensions.

19. The bracket of claim 18 wherein said extensions are bent inwardly of said second flange.

20. The bracket of claim 19 wherein at least one said barb on each said extension is deformed inwardly of its extension.

21. A bracket for mounting electrical boxes to wall studs, said bracket including a web having a pair of spaced-apart opposed first and second flanges extending therefrom for receiving a wall stud therebetween, stud gripping means on said flanges and extending inwardly thereof for gripping a stud therebetween, said stud gripping means on each of said flanges including a plurality of barbs spaced-apart both longitudinally and transversely thereof.

22. The bracket of claim 21 wherein said first flange has an elongated resilient arm connected therewith remote from said web and extending generally along said first flange in inwardly inclined relationship thereto back toward said web, said arm having an arm terminal end portion located adjacent said web, and said barbs on said first flange being on said arm terminal end portion.

23. The bracket of claim 21 wherein said web has a web length between opposite web ends, said web having a narrow web extension portion having a length substantially less than said web length, and said second flange being on said web extension portion.

24. The bracket of claim 23 wherein said web has a web width and said web extension portion has a width substantially less than said web width.

25. The bracket of claim 24 wherein said web extension portion is substantially centrally located between said web ends.

26. A bracket for mounting electrical boxes to wall studs, said bracket including a web having a pair of first and second opposed flanges extending therefrom and between which a wall stud is receivable, said first flange having a free end portion remote from said web, a resilient arm extending from said free end portion of said first flange back toward said web in inwardly inclined spaced relationship to said first flange, said arm having an arm terminal end portion adjacent said web, and stud gripping means on said arm terminal end portion and on said second flange for gripping a stud therebetween, and said stud gripping means on said arm terminal end portion comprising a plurality of barbs spaced-apart both longitudinally and transversely of said arm.

27. A bracket for mounting electrical boxes to wall studs, said bracket including a web having a pair of first and second opposed flanges extending therefrom and between which a wall stud is receivable, said first flange having a free end portion remote from said web, a resilient arm extending from said free end portion of said first flange back toward said web in inwardly inclined spaced relationship to said first flange, said arm having an arm terminal end portion adjacent said web, stud griping means on said arm terminal end portion and on said second flange for gripping a stud therebetween, and said stud gripping means on said second flange comprising a plurality of barbs spaced-apart both longitudinally and transversely of said second flange.

28. A bracket for mounting electrical boxes to wall studs, said bracket including a web having a pair of first and second opposed flanges extending therefrom and between which a wall stud is receivable, said first flange having a free end portion remote from said web, a resilient arm extending from said free end portion of said first flange back toward said web in inwardly inclined spaced relationship to said first flange, said arm having an arm terminal end portion adjacent said web, and stud gripping means on said arm terminal end portion and on said second flange for gripping a stud therebetween, said second flange having opposite side edges and a terminal end, extensions extending outwardly from said side edges adjacent said terminal end, said stud gripping means on said second flange being on said extensions and comprising a plurality of barbs on each of said extensions spaced-apart longitudinally of said second flange, said plurality of barbs on each said extension including an initial barb located closest to said web and a terminal barb located closest to said terminal end of said second flange, and said terminal barbs extending inwardly of said second flange a greater distance than said initial barbs.

* * * * *